3,389,553
COMBINED SYSTEM FOR AIRCRAFT ENGINE AND CABIN SUPERCHARGING
James A. Hardy, Playa Del Rey, and Robert L. Cholvin, Santa Monica, Calif., assignors to The Garrett Corporation, Los Angeles, Calif., a corporation of California
Filed Mar. 7, 1966, Ser. No. 532,277
15 Claims. (Cl. 60—13)

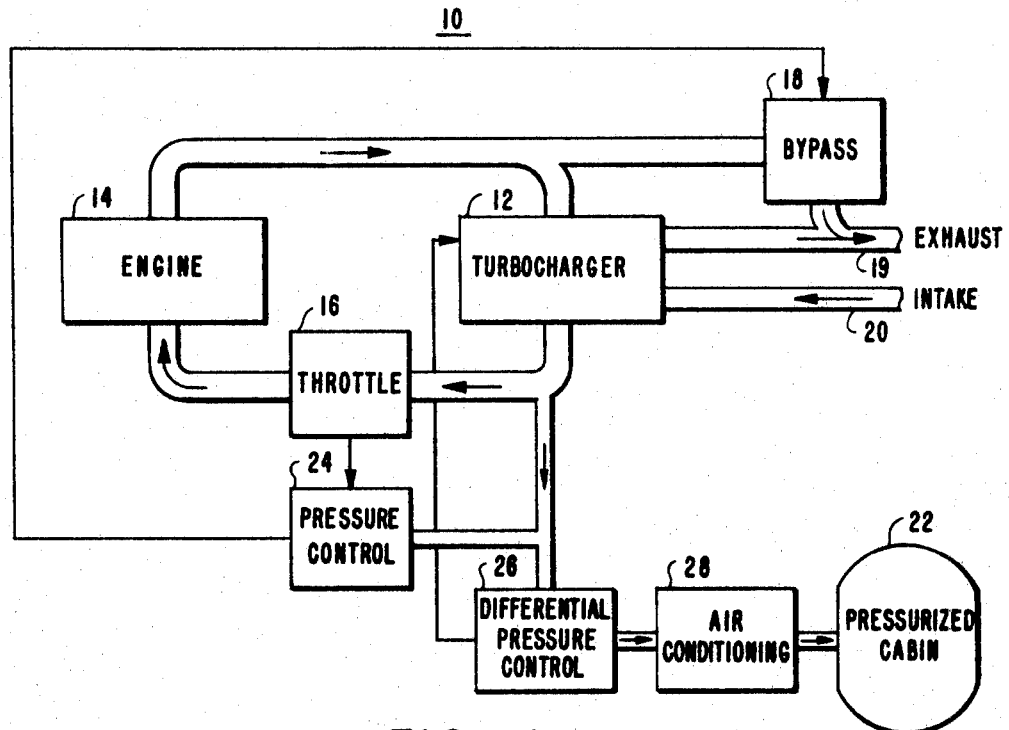
FIG.—1
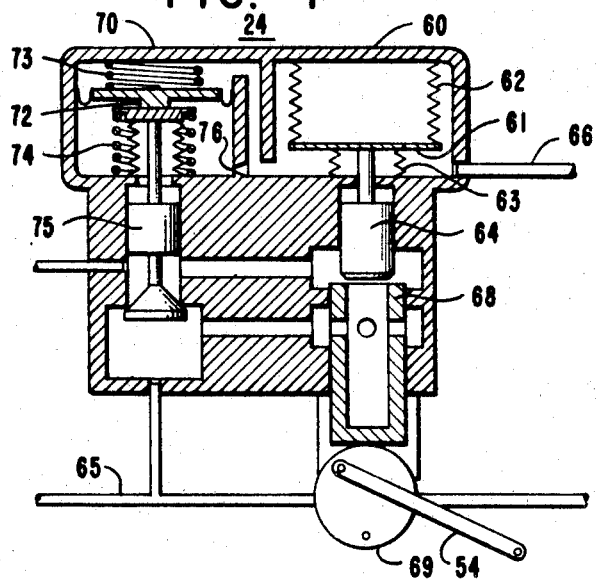
FIG.—3

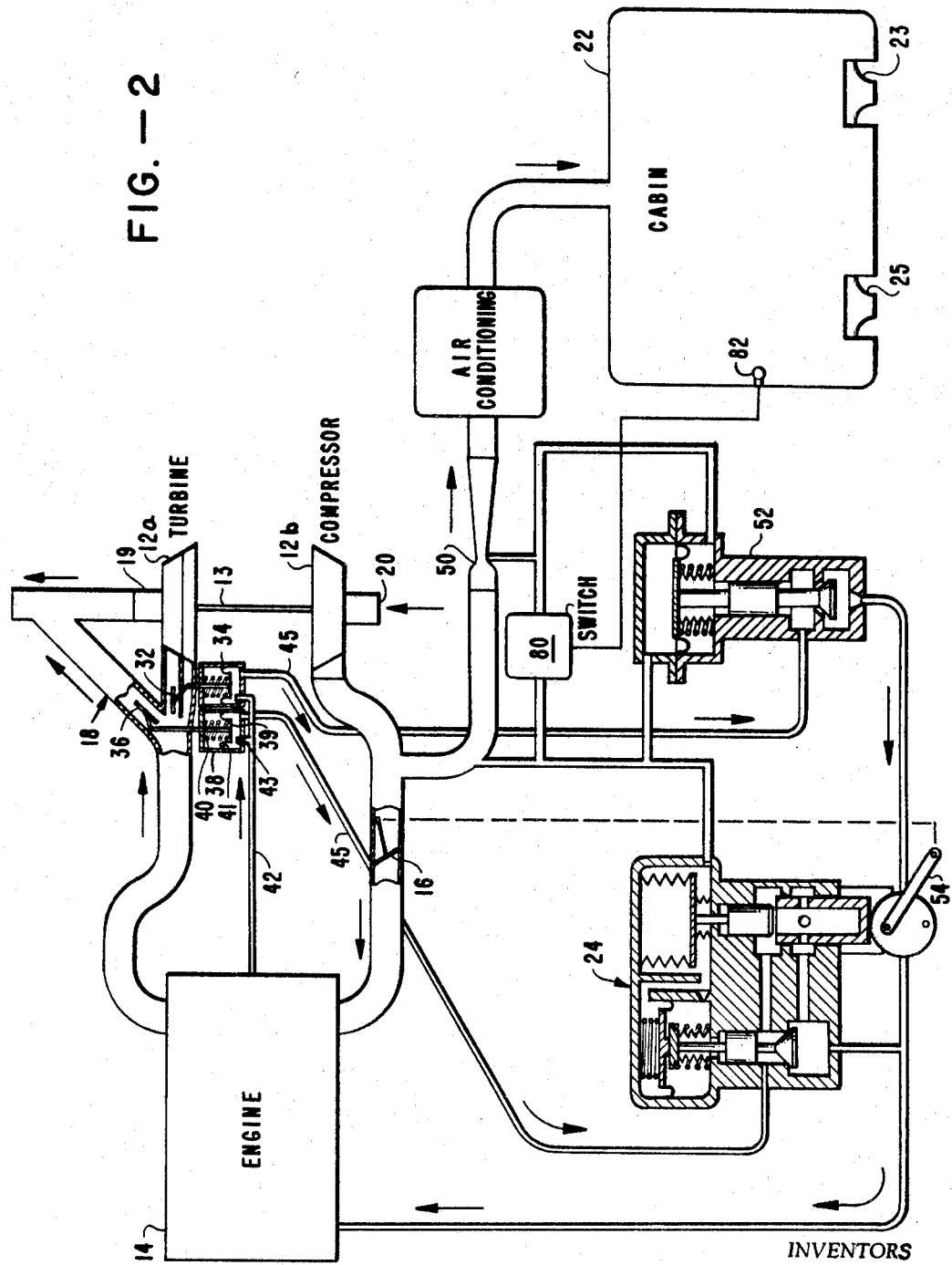

ABSTRACT OF THE DISCLOSURE

An engine exhaust driven turbocharger system for supplying pressured air to both an engine and an aircraft cabin utilizing a variable power turbine and providing means for controlling the turbine power in response to demand for pressurized cabin air.

---

This invention relates to cabin pressurization systems for aircraft, and more particularly, to systems for providing air for both cabin pressurization and for engine supercharging from an exhaust-driven turbocharger.

Reciprocating engine aircraft, in order to perform adequately at extended altitudes, require supercharging of the engine to provide intake air of sufficient density. With supercharging of the engine, the altitude then becomes limited by the capability of the pilot and any passengers to withstand the rarefied atmosphere at higher altitudes. Although it is of course possible to provide individual oxygen supplies by way of oxygen mask respiratory apparatus, this is not very convenient, either in small aircraft such as those principally used for pleasure or in commercial aircraft still in service and using reciprocating engines. Therefore, particularly for the larger commercial aircraft of the reciprocating engine type, engine-driven pressurizing systems are provided for cabin pressurization. Such systems as have been put into use typically depend upon a separate mechanically driven compressor or blower to provide the air for cabin pressurization. Such a separate system for cabin pressurization only, however, adds such cost and weight to the propulsion system of the aircraft as to be impractical for use in smaller aircraft. Therefore, to the present time, smaller aircraft of the pleasure or utility type have generally operated without cabin pressurization. Many of these aircraft, however, are provided with supercharging for the engine by means of a turbocharger which is driven by exhaust gases from the engine. These exhaust gases are directed through a turbine which is shaft-coupled to a centrifugal compressor which compresses air for the engine intake. Bleeding off some of the compressed air from the turbocharger for use in cabin pressurization is possible with the addition of suitable controls to make the system operate properly under all engine regimes and flight conditions. Cabin pressurization must be maintained, however, under all normal engine operating conditions. One particular operating condition which is commonly encountered and which results in substantially reduced turbocharger output is that which occurs during letdown from a higher altitude. It is common for the engine to be throttled back to approximately 25% of full power setting during this condition. In order that there may be adequate air supplied for cabin pressurization, it is essential that the turbocharger be controlled in some way so as to provide the required output while being driven from the reduced flow of exhaust gases which results when the engine is operating at such low power levels. Previously known attempts to deal with this problem have not resulted in equipment which was satisfactory for commercial performance.

In cabin pressurization systems, the pilot is provided with a selector which determines the equivalent altitude of the cabin. That is, if the selector is set to an altitude of 5,000 feet, for example, the cabin pressurization system maintains the air pressure within the cabin at a level corresponding to an altitude of 5,000 feet, regardless of the actual altitude of the airplane within the operational limits thereof. For example, the pressurization within the cabin is permitted to go up in altitude (decreasing in density) as the airplane climbs until the 5,000-foot altitude is reached. The cabin pressurization system thereafter maintains the altitude of 5,000 feet for all actual altitudes of the aircraft above that level. Upon beginning a descent, the pilot selects the altitude setting corresponding to the location at which the aircraft is to land and also selects a rate of cabin pressure change which will correspond to the time required for letdown. The pilot is generally provided with separate indicators for both rate of cabin pressure change and for cabin altitude as required by the FAA.

Accordingly, therefore, it is a general object of the present invention to provide a cabin pressurization system for use on aircraft having a supercharged engine with a minimum of additional weight required.

It is also an object of the present invention to provide a cabin pressurization system of low cost for use on small aircraft.

It is a more specific object of the present invention to provide a cabin pressurization system which may be supplied with compressed air from the same pressurizing system that is employed to supercharge the aircraft engine.

It is a particular object of the present invention to provide a combination system for supercharging both the aircraft engine and the cabin from a single exhaust-driven turbocharger.

Exhaust-driven turbochargers of the type employed in systems in accordance with the present invention are preferable to direct-driven superchargers, since as presently developed they are lighter and perhaps more reliable, and also they are more efficient in that they utilize waste energy from the exhaust gases of the reciprocating engine, as contrasted with the mechanically driven superchargers which require shaft power from the engine. While the energy of the exhaust gases is not utilized in the exhaust-driven turbocharger without some reduction of maximum power from the engine, it turns out that the usable output power from the engine is greater when a supercharger is driven by exhaust gases than when it is mechanically coupled to the shaft.

In brief, arrangements in accordance with the present invention may incorporate an exhaust-driven turbocharger having a so-called "variable gulp" turbine (i.e., one in which turbine power can be controlled over a wide variation of exhaust gas flow). In one particular arrangement to be described herein, a dual scroll turbine is utilized for the purpose and is provided with a butterfly valve which may be controlled to divert the flow of exhaust gases to a portion only of the turbine, thus permitting a smaller turbine nozzle area to maintain turbocharger speed under low engine power operation. Also incorporated is a waste gate comprising a bypass conduit having a butterfly valve therein which is also controllable to permit suitable drive of the turbocharger under a considerable range of altitude and engine power settings. Compressed air from the compressor of the turbocharger is supplied to the engine through the normal engine throttle valve and to the aircraft cabin through a flow-limiting element in the form of a sonic venturi which permits a substantially constant flow of air over a wide range of cabin pressures. A nozzle may be employed in place of the venturi for limiting flow, if desired. The butterfly valves of the waste gate and of the dual scroll turbine are controlled in one particular arrangement by actuators driven by oil from the engine oil system. Oil flow through the respective actuators is controlled by suitable control mechanisms. Other types of actuators may be employed (e.g., pneumatic or electric) for the same function, if preferred, or it may be possible to control the valves directly. In the described arrangement, a first control mechanism controls the actuator for the waste gate valve in response to the absolute pressure of the cabin and engine supply air as it is flowing from the turbocharger compressor. A second control mechanism controls the actuator for the turbine scroll diverter valve in accordance with the difference in pressure between the air coming from the compressor and the cabin air as the pressure is sensed at the throat of the sonic venturi. In a preferred embodiment, the absolute pressure control mechanism is also provided with a rate control unit which controls the actuator of the waste gate valve in conjunction with the absolute pressure control in order to limit overboost of the turbocharger on rapid throttle advance.

The operation of the system in accordance with the invention will be described under various operational conditions of the aircraft. At sea level with full engine power setting, very little air compression is required by the compressor and the turbo speed is low with the waste gate valve modulating near full open and the turbine scroll diverter valve full open. Opening of the waste gate valve is accomplished when the absolute pressure controller senses compressor discharge pressure at its high setting value which is required for engine full power output and bleeds off oil pressure from the waste gate valve actuator. Opening of the turbine scroll diverter valve is accomplished when the differential pressure controller senses a venturi inlet-to-throat differential pressure which is greater than one pound per square inch and bleeds off oil pressure from the diverter valve actuator. This differential may be referred to herein as the pressure drop across the venturi, although those skilled in the art will know that the minimum pressure occurs at the throat in sonic flow. Both valves are spring loaded normally open and therefore will assume the open position when oil pressure is bled off from the respective valve actuators. The valves close when the servovalves in the respective controllers are closed to stop bleeding oil from the actuators and when engine oil pressure of 60 pounds per square inch or greater is supplied to the actuators.

The dual scroll turbine serves to provide a small turbine nozzle area which is required to maintain turbocharger speed under low engine power operation. At high altitude, low power, letdown condition, the turbocharger compressor must supply enough boost pressure to maintain cabin pressurization even though little air flow is being used by the engine. Under these conditions of aircraft operation, both the waste gate and diverter valves are closed to keep turbocharger r.p.m. high. Closure of the valves is accomplished by the absolute pressure controller sensing compressor discharge pressure at its low setting value and shutting off oil bleed flow from the waste gate valve actuator, allowing oil pressure to close this valve. Similarly, the diverter valve in the turbine scroll is closed when the differential pressure controller senses venturi differential pressure less than one pound per square inch and shuts off oil bleed from the diverter valve actuator.

At intermediate altitudes and power conditions, the dual valves are modulated to intermediate positions by the respective controllers to maintain compressor discharge pressure as a function of engine throttle lever position. The valves work in sequence in response to their respective controllers such that the waste gate valve closes before the diverter valve starts to close by virtue of the controller pressure settings. In accordance with an aspect of the invention, the absolute pressure control is linked to the engine throttle lever so as to vary the setting of the controller as a function of engine power required. The absolute pressure controller has a minimum setting which is sufficient to maintain full air flow to the cabin at sea level cabin pressure. The differential pressure controller is preferably set at one pound per square inch which represents subsonic flow through the venturi at a value of one-half the normal sonic flow. The sonic venturi limits bleed air flow from the compressor to the cabin to a value approximately 15% of full power engine air flow. Air flow through the sonic venturi is relatively constant and independent of cabin pressure. Sonic flow, which is required for such flow limiting, will occur at the venturi throat with a pressure ratio as low as 1.1 between the venturi inlet and the venturi outlet.

In accordance with a further aspect of the invention, a pressure detector arrangement is provided to sense the pressure differential between inlet and outlet of the sonic venturi and to provide a warning indication when the differential pressure thus sensed drops below a predetermined minimum. Preferably, the differential pressure detector may be set to provide the warning indication when a differential pressure of approximately 0.2 pound p.s.i. below the setting of the differential pressure controller is sensed. With such an arrangement, the actuation of the differential pressure warning system would indicate subsonic flow in the venturi at a rate approximately one-half the normal cabin flow with the diverter valve fully closed. In this arrangement, a light or gauge in the aircraft cabin activated by the differential pressure sensor will indicate to the pilot when the minimum engine power is reached at which this half flow can be maintained, thus providing a direct and simple method for the pilot to know, under any let-down condition, when he has reached this minimum power.

A better understanding of the invention may be had from the following and detailed description, taken in conjunction with the accompanying drawings, wherein:

FIG. 1 is a generalized block diagram of one particular arrangement in accordance with the invention;

FIG. 2 is a diagram of the arrangement shown in FIG. 1 as represented in greater detail; and FIG. 3 is a diagram showing a particular portion of the arrangement of FIGS. 1 and 2.

In the supercharging system 10 in accordance with the invention as shown in FIG. 1, a turbocharger 12 is coupled to an engine 14 so as to be driven by the exhaust gases from the engine 14 and to provide supercharged air to the engine intake through the throttle valve 16. A bypass unit 18 is positioned to pass exhaust gases directly from the engine 14 to an exhaust conduit 19. The turbocharger 12 receives inlet air from an intake 20 which is compressed and supplied to the engine 14 and to the pressurized cabin 22. On its way from the turbocharger 12 to the pressurized cabin 22, the compressed air is directed to a pressure control unit 24 and a differential pressure control unit 26. The pressure control unit 24 is connected to control the bypass unit 18 in accordance with the pressure of the air at the output of the turbocharger 12. Similarly, the differential pressure control unit 26 is connected to control the turbocharger 12 by varying the drive to the turbocharger turbine. An air conditioning unit 28 is shown for suitably heating, cooling or otherwise conditioning the air before it is supplied to the pressurized cabin 22. Thus, under the varying engine operational conditions as described above, systems in accordance with the invention suitably control the operation of the turbocharger 12 by means of the pressure and differential pressure control mechanisms 24, 26 to maintain a suitable pressure at the output of the compressor of the turbocharger 12.

It will also be noted that a control link is provided between the throttle 16 and the pressure control mechanism 24 which in one preferred embodiment of the invention comprises a mechanical linkage by which the setting of the pressure control mechanism 24 is varied in accordance with engine throttle settings.

As shown in FIG. 2, the cabin is provided with a cabin safety valve 23 and a cabin pressure regulator valve 25. These, together with the air conditioning unit 28 of FIG. 1, are shown for the sake of completeness only and will not be described in further detail, as they are not part of the present invention and their use is well known to those skilled in the art.

As shown in somewhat greater detail in the diagram of FIG. 2, it may be seen that the turbocharger comprises a compressor 12b and a turbine 12a which is of the dual scroll type and has a diverter valve 32 in position to divert air from one of the turbine scrolls. The diverter valve 32 is actuated by a hydraulic actuator 34 which in this particular arrangement utilizes as the hydraulic fluid oil from the engine oil supply. This oil is typically supplied at a pressure of 60 pounds per square inch or more which is adequate for utilization for this purpose. The bypass or waste gate 18 includes a butterfly valve 36 which is similarly controlled by a corresponding actuator 38. Both of the actuators 34, 38 are substantially identical to each other and as shown in connection with actuator 38 comprise a piston 39 biased by a spring 40 and provided with a seal 41 within the housing of the actuator 38. Suitable mechanical linkage is coupled between the associated valve 36 and the piston 39. Engine oil is provided to the actuators 34, 38 via a conduit 42 and the rate of flow to the individual actuator is limited by an orifice 43. An outlet conduit 45 leads from the actuator oil chamber to a corresponding control mechanism and, since the rate of oil flow into the actuator is limited by the orifice 43, the position of the piston 39 and its associated value is determined by the rate of flow through the outlet conduit 45 which in turn is controlled by the associated control mechanism.

Compressed air from the compressor 12b, driven by the turbine 12a via a direct shaft 13, is supplied to the engine 14 through a conduit controlled by the engine throttle valve 16 and is also directed to the cabin 22 through a sonic venturi 50. The sonic venturi 50 may be considered part of the differential pressure control mechanism 26 of FIG. 1. As shown in FIG. 2 a differential pressure controller 52 is coupled to receive air from the upstream side of the venturi 50 and also from the throat thereof, thus permitting response in accordance with the pressure drop at the venturi 50. The pressure control unit 24 is coupled to receive air from the outlet of the compressor 12b and by virtue of its connection through the conduit 45 to the actuator 38 serves to control the waste gate valve 36 in accordance with that pressure. Mechanical linkage between the engine throttle valve 16 and a lever 54 coupled to the pressure control unit 24 is represented by a dashed line. Although the differential pressure controller structure is not precisely identical, the operation of the pressure control 24 and the differential pressure control unit 52 is similar and may be better understood by reference to FIG. 3 which shows the pressure control unit 24 in somewhat larger scale. As represented therein, the pressure control unit 24 actually comprises two control valves effectively operating in parallel to control the flow of oil through the connected conduit 45 leading from the actuator 38. The absolute pressure control portion of the pressure control unit 24 occupies the right hand portion of the unit and is connected directly to the cabin supply air passage leading from the compressor 12b of FIG. 2. As shown in FIG. 3, the absolute pressure control portion comprises a bellows end plate 61 connected to appropriate spring bellows 62 and 63 and coupled to a valve plunger 64. Air at the pressure of the turbocharger compressor output is supplied via a conduit 66 to the underside of the plate 61 as shown. The valve plunger 64 bears against a valve seat 68 which is arranged to be variably positioned by a cam 69 controlled by the lever 54 coupled to the engine throttle valve 16. At some absolute pressure level (depending on the throttle setting), the plate 61 will be sufficiently lifted to raise the valve plunger 64 off the valve seat 68, thus permitting oil to flow through the passages from the conduit 45 to the engine oil return conduit 65. Thus the actuator 38 of FIG. 2 is permitted to control the valve 36 in accordance with the absolute air pressure sensed by the pressure controller 60 and in accordance with the setting of the throttle 16.

The operation of the absolute pressure controller 60, just described, is modified by the rate control portion 70 of the pressure control mechanism 24. The rate control unit occupies the left-hand side of the mechanism 24 and comprises a diaphragm 72 which is biased by springs 73 and 74 and which is coupled to a valve plunger 75. Air is freely admitted to the upper side of the diaphragm 72 at the pressure of the compressor output and is also admitted at a limited flow rate to the underside of the diaphragm 72 through an orifice 76. By means of this arrangement, a sudden increase in power setting of the engine tends to drive the turbocharger at increased speeds and thereby raise the pressure of the air from the compressor. Assuming that the waste gate valve 36 is in a closed or partially closed position, the change in setting of the throttle 16 moves the variable valve seat 68 to establish a new setting or new position for closure of the valve plunger 64. In order to eliminate problems from overboost of the turbine during the period of time in which the actuation of the absolute pressure control portion 60 is occurring, the rate control portion 70 is immediately actuated to dump oil from the conduit 45 so that the waste gate valve 36 is immediately opened. Within a short period of time as air is admitted through the orifice 76 and the pressure equalizes on both sides of the diaphragm 72 of the rate control portion 70, the valve 75 of the rate control unit 70 closes, passing control of the oil flow in the conduit 45 leading from the actuator 38 to the absolute pressure control portion 60, thus establishing the setting of the waste gate valve 36 in accordance with the pressure sensed by the unit 60. During this period, however, the absolute pressure control portion 60 has had time to adjust to the new setting and overboost of the turbocharger is avoided.

The structure of the differential pressure control unit 52 is similar to the rate control portion 70 of the pressure control unit 24 just described, except that no flow rate limiting orifice is included. However, it will be noted that air is admitted to both the upper and lower sides of the diaphragm of the differential pressure control unit 52, with the air on the upper side corresponding to the inlet pressure of the sonic venturi 50 and the air on the lower side corresponding to the throat pressure of the sonic venturi 50. Thus, the unit 52 responds in accordance with the difference of pressure between the input and throat of the sonic venturi 50 to control the associated actuator 34 which in turn controls the diverter valve 32.

In addition to the above-described arrangements there is also shown in FIG. 2 a low flow pressure switch 80 which is connected to respond to the difference in pressure at the sonic venturi 50. In the depicted arrangement, the switch 80 is connected to actuate a low flow indicator light 82 in the cabin 22 when the pressure difference between inlet and the throat of the sonic venturi 50 drops below a predetermined level corresponding to the threshold setting of the switch 80. In a preferred embodiment, the threshold setting of the low flow pressure switch 80 is set approximately 0.2 pound per square inch below the setting of the differential pressure controller 52 which is maintained at approximately one pound per square inch. When set in this fashion, the indicator light 82 provides an indication to the pilot that subsonic air flow through the venturi 50 is at a level approximately one-half the normal cabin flow, thus enabling the pilot to adjust minimum engine power until the half-flow rate is maintained.

In most applications, the switch 80 and indicator 82 are not essential to achieve the desired operation, since FAA requirements call for gauges which provide an indication of both cabin altitude and rate of cabin altitude change.

These indications can generally be relied upon in establishing the engine power setting at a level which is adequate to maintain the minimum permissible flow of pressurized air to the cabin.

Thus, as shown and described herein, arrangements in accordance with the invention serve to provide pressurized air to both the engine and cabin of an aircraft from a turbocharger driven by engine exhaust gases from the engine. The turbocharger is controlled to provide air at suitable pressures and rates of flow to both places at virtually all normal operating conditions of the engine. An arrangement is also provided for sounding a warning or other indication in the event that the system does not provide adequate air to the cabin so that the engine power setting may be adjusted to the minimum level which will provide the cabin pressurization required.

The above-described arrangement in accordance with the invention permits the pressurization of an aircraft cabin in addition to or in conjunction with the supercharging of an aircraft engine with a minimum of additional equipment and a corresponding minimum additional cost and weight. In aircraft which are already provided with exhaust-driven turbochargers, it may be possible in many instances to add the cabin pressurization portion of the above-described system without any increase in turbocharger capacity. This is possible because the air required for cabin pressurization constitutes only about 15% of the air produced by the turbocharger compressor and in many cases the turbocharger of a particular installation has sufficient reserve capacity over that required for supercharging the engine to permit the addition of the cabin pressurization system. In other cases where the maximum capacity of the turbocharger is already matched to the horsepower rating of the engine, the cabin pressurization system may be added with a substitution of the next larger frame size turbocharger, which involves an additional weight of only 5 to 10 pounds. Furthermore, in the usual engine supercharger system utilizing an exhaust-driven turbocharger, an absolute pressure controller and a waste gate in the bypass conduit are already provided. Therefore, all that are required by way of additional equipment to provide the combined cabin and engine pressurization with the above-described system are a dual scroll housing on the turbine with a scroll diverter valve and an associated differential pressure control unit. In such a situation, it may also be desirable to substitute the particular pressure control unit described above for the other units which may be already installed. In view of these possibilities, it may be seen that the cost and weight advantages of utilizing arrangements in accordance with the invention are substantial, and the importance of this is obvious in relationship to the provision of cabin pressurization in light planes. It will of course be manifest that the system of the present invention, while of particular advantage in connection with light aircraft of the pleasure and utility type, is also adaptable to aircraft of any size employing reciprocating engines. The installation of a system in accordance with the invention may involve a considerable weight saving over the direct-driven, separate compressor system presently employed in commercial aircraft of the reciprocating engine type.

Although there has been described above one specific arrangement of a combined system for aircraft engine and cabin supercharging in accordance with the invention for the purpose of illustrating the manner in which the invention may be used to advantage, it will be appreciated that the invention is not limited thereto. Accordingly, any and all modications, variations or equivalent arrangements falling within the scope of the annexed claims should be considered to be a part of the invention.

What is claimed is:

1. A turbocharger system for supercharging both the cabin and the engine of an aircraft from a common compressor comprising a turbocharger arranged to be driven by engine exhaust gases, first and second separate means for varying the turbocharger turbine power over a wide range of gas flow rates, a first duct leading from the compressed air output of the turbocharger to the engine, a second duct leading from the compressed air output of the turbocharger to the cabin and having a flow limiting means therein, and means for sensing both compressed air pressure and cabin air flow and controlling both the turbine power varying means in response thereto.

2. A turbocharger pressurizing system for supercharging an aircraft cabin and an aircraft engine from a single compressor comprising a turbocharger driven by exhaust gases, means for varying the drive of the turbocharger in response to varying exhaust gas flow rates, a pressure controller coupled to respond to the pressure of air from the turbocharger for controlling a first one of said varying means, flow limiting means for passing compressed air from the turbocharger for utilization at a substantially constant rate for cabin pressurization, and a differential pressure controller coupled to respond to a pressure drop at said flow limiting means for controlling a second one of said varying means.

3. A turbocharger system for supercharging both the cabin and engine of an aircraft from a common compressor comprising a turbocharger, first and second variable adjusting means for controlling the turbocharger in response to engine exhaust gas flow at different rates, a pressure controller coupled to the compressed air output of the turbocharger and arranged to control the first of said variable adjusting means in response to the pressure of said compressed air, means for varying the point at which the pressure controller begins to control the first of said variable adjusting means in accordance with the operating power level of the aircraft engine, means for directing compressed air from the turbocharger output to pressurize the aircraft cabin at a substantially constant flow rate over a relatively wide range of cabin air pressures, and a differential pressure controller unit coupled to said air directing means for controlling the second of said variable adjusting means in accordance with a pressure differential in the air directing means.

4. A turbocharger system for supercharging both the cabin and engine of an aircraft from a common compressor comprising a turbocharger arranged to be driven by exhaust gases, a bypass conduit having a valve therein for controlling the flow of exhaust gases around the turbocharger, the turbocharger including a turbine having a dual scroll housing and a diverter valve for varying the response of the turbine to applied exhaust gas flow rates, a first duct leading from the compressed air output of the turbocharger to the engine and having a throttle valve therein, a second duct leading from the compressed air output of the turbocharger to the cabin and having a sonic venturi positioned therein, and plural means for controlling both the bypass valve and the diverter valve in response to the pressure of the compressed air at the output of the turbocharger and to the difference in pressure across the sonic venturi respectively.

5. An arrangement in accordance with claim 4 wherein the valve controlling means are arranged to control said valves independently of each other.

6. An arrangement in accordance with claim 4 further including a linkage between said throttle valve and the bypass valve controlling means for adjusting the operative level of said control means in accordance with the setting of the throttle valve.

7. A system in accordance with claim 4 wherein the valve controlling means responsive to the compressed air output comprises a pressure controller having a housing enclosing a first absolute pressure controller and a second rate controller, the absolute pressure controller being arranged to establish the bypass valve position in response to absolute pressure of the compressed air from the turbocharger and having a variably positioned valve seat which is controlled in response to the setting of the throttle valve.

8. A system in accordance with claim 7 wherein the rate controller includes a diaphragm, a first passage for admitting air to one side of said diaphragm, and a second passage restricted by an orifice for admitting air at a limited flow rate to the remote side of said diaphragm, said diaphragm being connected to control the rate controller in response to the difference in pressure across the diaphragm.

9. A system in accordance with claim 7 wherein the means for variably positioning the valve seat comprises a rotatable, off-center cam and mechanical linkage connected between the throttle valve and the cam for causing the cam to control the position of the valve seat.

10. A turbocharger system for supercharging both the cabin and engine of an aircraft from a common compressor comprising a turbocharger arranged to be driven by exhaust gases from the engine and having a dual scroll turbine with a diverter valve for closing off one of the scroll passages and a compressor coupled to the turbine by a shaft, conduits for directing compressed air from the compressor to the engine and the cabin respectively, a bypass conduit having a waste gate valve therein and arranged to bypass exhaust gases around the turbine, a first hydraulic actuator connected to control the position of the waste gate valve, a second hydraulic actuator connected to control the position of the diverter valve, a sonic venturi connected in the conduit supplying compressed air to the cabin, a pressure control mechanism connected to control the first actuator in accordance with the pressure of the compressed air from the compressor, and a differential pressure controller connected to control the second actuator in accordance with a difference in pressure across the sonic venturi.

11. A system in accordance with claim 10 further including means for supplying oil under pressure from the engine to the first and second actuators at a controlled rate and wherein said first and second controllers include pressure responsive valves for controlling the rate of flow of said engine oil out of said actuators.

12. A turbocharger system for supercharging both the cabin and engine of an aircraft from a common compressor comprising an exhaust gas driven turbocharger, first and second variable adjusting means for controlling the turbocharger in response to engine exhaust gas flow at different rates, conduit means for directing compressed air from the turbocharger to the engine and cabin respectively, means for developing a pressure drop in the cabin air supply conduit, pressure sensing means for controlling the first variable adjusting means in accordance with the pressure of the compressed air from the turbocharger, differential pressure sensing means for controlling the second variable adjusting means in accordance with said pressure drop, and means for modifying the response of the pressure sensing means for a short period following a change in compressed air pressure to prevent overboost of the turbocharger following a change in engine power setting.

13. A system in accordance with claim 12 wherein said engine supply air conduit includes a throttle valve and further including means mechanically linked to said throttle valve for varying the point at which the pressure sensing means becomes operative in controlling the first variable adjusting means.

14. A system in accordance with claim 12 further including an arrangement for providing an indication when the rate of flow of air through the cabin supply conduit drops below a predetermined level.

15. A system in accordance with claim 14 wherein said indicating means comprises a pressure switch coupled across the pressure drop means in circuit with an electrical indicator.

References Cited

UNITED STATES PATENTS

| 1,816,787 | 7/1931 | Moss | 60—13 |
| 2,374,708 | 5/1945 | Shoults | 98—1.5 |
| 2,459,000 | 1/1949 | Morris | 98—1.5 |
| 2,545,563 | 3/1951 | Welch | 98—1.5 |

CARLTON R. CROYLE, *Primary Examiner.*

MARK M. NEWMAN, *Examiner.*

D. HART, *Assistant Examiner.*